(12) United States Patent
Kim et al.

(10) Patent No.: US 7,995,870 B2
(45) Date of Patent: Aug. 9, 2011

(54) INFORMATION PARTS EXTRACTION FOR RETRIEVING IMAGE SEQUENCE DATA

(75) Inventors: Whoi-Yul Kim, Seoul (KR); Min-Seok Choi, Seoul (KR); Hyun-Chul Kim, Daegu (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 1013 days.

(21) Appl. No.: 11/881,757

(22) Filed: Jul. 27, 2007

(65) Prior Publication Data
US 2008/0031523 A1  Feb. 7, 2008

Related U.S. Application Data

(63) Continuation of application No. PCT/KR2005/003205, filed on Sep. 27, 2005.

(30) Foreign Application Priority Data

Jan. 27, 2005 (KR) ........................ 10-2005-0007594

(51) Int. Cl.
*G06K 9/54* (2006.01)
*G06K 9/60* (2006.01)
*G06K 9/00* (2006.01)
*G06K 9/46* (2006.01)
*G06K 9/66* (2006.01)
*G01B 11/24* (2006.01)
*G06F 7/00* (2006.01)
*G06F 17/30* (2006.01)

(52) U.S. Cl. ........ 382/305; 382/103; 382/107; 382/190; 382/195; 382/203; 382/243; 382/248; 382/250; 356/613; 707/736; 707/770

(58) Field of Classification Search .................. None
See application file for complete search history.

(56) References Cited

U.S. PATENT DOCUMENTS
6,654,483 B1 * 11/2003 Bradski .................... 382/107
(Continued)

FOREIGN PATENT DOCUMENTS
JP       2000-287165 A      10/2000
(Continued)

OTHER PUBLICATIONS

Lee et al.; "Shape-sequence-based key image generation algorithm for browsing and retrieval of video clips", Electronics Letters, vol. 38, Issue 12, Jun. 6, 2002, pp. 549-550.*

(Continued)

*Primary Examiner* — Tom Y Lu
*Assistant Examiner* — Thomas A Conway
(74) *Attorney, Agent, or Firm* — Knobbe Martens Olson & Bear LLP

(57) ABSTRACT

A method of extracting information parts, and a recorded medium recording the method, for retrieving image sequence data are disclosed. According to an embodiment of the present invention, image frames included in an image sequence are converted to frames, in a quantity of n, including only the object that is separated from a background, and the corresponding shape descriptors, in a quantity of n, are extracted. The shape descriptors, in a quantity of n, are aligned according to a temporal order, to generate a shape sequence, which is frequency-converted along the time axis to obtain conversion coefficients having frequency information. Using coefficients in a low frequency area among the obtained conversion coefficients, a shape sequence descriptor is extracted. With this invention, video data expressing the motion of an object can be captured as an image sequence, and the similarity between video data can be distinguished by extracting information parts from each image sequence.

13 Claims, 16 Drawing Sheets

U.S. PATENT DOCUMENTS

| | | | |
|---|---|---|---|
| 7,212,671 B2 * | 5/2007 | Kim et al. | 382/190 |
| 2004/0207656 A1 | 10/2004 | Lee | |

FOREIGN PATENT DOCUMENTS

| | | |
|---|---|---|
| JP | 2000-358192 A | 12/2000 |
| JP | 2001-167095 | 6/2001 |
| KR | 10-2002-0096998 | 12/2002 |
| WO | WO 02103562 A1 | 12/2002 |
| WO | WO 03/056463 A1 | 7/2003 |

OTHER PUBLICATIONS

Bober, "MPEG-7 Visual Shape Descriptors", IEEE Trans on Circuits and Systems for video technology, vol. 11, No. 6, 2001, pp. 1-4.*

Chalechale et al., "Edge image description using angular radial partitioning", IEE Proc.—Vis IMage Signal Process., vol. 151, No. 2, 2004, pp. 93-101.*

Ricard et al. "Generalization of angular radial transform", ICIP 2004, pp. 2211-2214.*

Min-Seok Choi and Whoi-Yul Kim, "A Method of Describing and Retrieving a Sequence of Moving Object Using Shape Variation Map", 11-B, vol. 1 , Feb. 2004.

Yamada, Akio, "Multimedia Content Description International Standard MPEG-7 2. Standardization 2-1 The technique described visual," ITE Journal, Institute of Film The Institute of Image Information, Nov. 2002, vol. 56, No. 11, p. 1711-1714.

Office Action dated Jul. 6, 2010 for JP Application No. 2007-553023.

* cited by examiner

| DATA GROUP | SAMPLE IMAGE SEQUENCE |
|---|---|
| m01 |  |
| m02 |  |
| m03 |  |
| m04 |  |
| m05 |  |
| m06 |  |
| m07 |  |
| m08 |  |
| m09 |  |
| m10 |  |
| m11 |  |

| DATA GROUP | SAMPLE IMAGE SEQUENCE |
|---|---|
| m12 |        |
| m13 |        |
| m14 |        |
| m15 |        |
| m16 |        |
| m17 |        |
| m18 |        |
| m19 |        |
| m20 |        |
| m21 |        |
| m22 |        |

|  | Temporal Template with Hu moments | Temporal Template with ART descriptor | Shape Sequence descriptor | Shape Variation descriptor |
|---|---|---|---|---|
| m01 | 0.585 | 0.320 | 0.370 | 0.425 |
| m02 | 0.595 | 0.070 | 0.025 | 0.115 |
| m03 | 0.475 | 0.400 | 0.000 | 0.155 |
| m04 | 0.250 | 0.295 | 0.000 | 0.095 |
| m05 | 0.375 | 0.205 | 0.000 | 0.205 |
| m06 | 0.250 | 0.175 | 0.010 | 0.525 |
| m07 | 0.260 | 0.110 | 0.035 | 0.445 |
| m08 | 0.155 | 0.235 | 0.000 | 0.070 |
| m09 | 0.635 | 0.345 | 0.165 | 0.280 |
| m10 | 0.490 | 0.335 | 0.045 | 0.160 |
| m11 | 0.245 | 0.105 | 0.000 | 0.230 |
| m12 | 0.410 | 0.285 | 0.115 | 0.145 |
| m13 | 0.240 | 0.355 | 0.155 | 0.405 |
| m14 | 0.140 | 0.095 | 0.010 | 0.015 |
| m15 | 0.250 | 0.450 | 0.170 | 0.505 |
| m16 | 0.280 | 0.105 | 0.100 | 0.110 |
| m17 | 0.615 | 0.120 | 0.020 | 0.405 |
| m18 | 0.355 | 0.275 | 0.065 | 0.250 |
| m19 | 0.080 | 0.045 | 0.000 | 0.135 |
| m20 | 0.470 | 0.275 | 0.085 | 0.570 |
| m21 | 0.200 | 0.375 | 0.200 | 0.415 |
| m22 | 0.421 | 0.395 | 0.075 | 0.300 |
| Average | 0.353 | 0.244 | 0.076 | 0.271 |

FIG. 9

| Data Group | Temporal Template with Hu moments | Temporal Template with ART descriptor | Shape Sequence descriptor |
|---|---|---|---|
| m01 | 20.00% | 25.00% | 45.00% |
| m02 | 20.00% | 60.00% | 95.00% |
| m03 | 40.00% | 65.00% | 100.00% |
| m04 | 55.00% | 90.00% | 100.00% |
| m05 | 50.00% | 70.00% | 100.00% |
| m06 | 60.00% | 50.00% | 100.00% |
| m07 | 55.00% | 60.00% | 95.00% |
| m08 | 80.00% | 61.50% | 100.00% |
| m09 | 10.00% | 50.00% | 75.00% |
| m10 | 30.00% | 40.00% | 95.00% |
| m11 | 65.00% | 95.00% | 100.00% |
| m12 | 35.00% | 65.00% | 85.00% |
| m13 | 65.00% | 15.00% | 80.00% |
| m14 | 70.00% | 80.00% | 95.00% |
| m15 | 60.00% | 20.00% | 70.00% |
| m16 | 55.00% | 100.00% | 90.00% |
| m17 | 15.00% | 65.00% | 95.00% |
| m18 | 20.00% | 55.00% | 90.00% |
| m19 | 80.00% | 80.00% | 100.00% |
| m20 | 35.00% | 35.00% | 80.00% |
| m21 | 70.00% | 40.00% | 70.00% |
| m22 | 20.00% | 30.00% | 100.00% |
| Average | 45.91% | 62.73% | 89.09% |

*FIG. 15*

INFORMATION PARTS EXTRACTION FOR RETRIEVING IMAGE SEQUENCE DATA

RELATED APPLICATIONS

This application is a continuation application, and claims the benefit under 35 U.S.C. §§120 and 365 of PCT Application No. PCT/KR2005/003205, filed on Sep. 27, 2005, which is hereby incorporated by reference.

BACKGROUND OF THE INVENTION

1. Field of the Invention

The present invention relates to information parts extraction, more specifically to a method of extracting information parts for retrieving image sequence data and a recorded medium recording the method.

2. Description of the Related Technology

With the popularity of imaging devices, such as a digital camera and a camcorder, a rapidly increasing number of multimedia data, such as digital image and video data, are generated. As a result, management and retrieval of generated multimedia data is increasingly sophisticated.

SUMMARY OF CERTAIN INVENTIVE ASPECTS

One aspect of the present invention provides a method of extracting information parts, and a recorded medium recording the method, for retrieving image sequence data that can distinguish the similarities between video data by capturing video data expressing the motion of an object as successive image frames (i.e., image sequence) and extracting information parts from each image sequence. Here, information parts for retrieving image sequence data include shape sequence and shape sequence descriptor for identifying the motion of an object as shape variation information of an object in accordance with time.

Another aspect of the present invention provides a method of extracting information parts, and a recorded medium recording the method, for retrieving image sequence data that can improve the video data retrieval efficiency by distinguishing individual motions using the motion variation of an object as well as the motion sequence of an object.

Another aspect of the present invention provides a method of extracting a shape sequence descriptor for content-based retrieval of an image sequence that express the motion of an object by a plurality of frames. The method comprises the following steps: converting image frames included in an image sequence to frames, in a quantity of n (natural number), including only the object that is separated from a background; extracting shape descriptors, in a quantity of n, corresponding to the frames, in a quantity of n, using the object; generating a shape sequence by aligning the shape descriptors, in a quantity of n, according to a temporal order; obtaining conversion coefficients having frequency information by frequency-converting the shape sequence along the time axis; and extracting a shape sequence descriptor using coefficients in a low frequency area among the conversion coefficients. The aspect also provides a system, device and recorded medium enabling the execution of the method.

In one embodiment, the method is preceded by the step of normalizing the shape descriptors, in a quantity of n, along the time axis in order to generate the shape sequence.

In one embodiment, the shape descriptors are extracted from the object in accordance with an angular radial transform (ART), defined by the equation $$F_{nm} = <V_{nm}(\rho, \theta), f(\rho, \theta)> = \int_0^{2\pi}\int_0^1 V_{nm}^*(\rho, \theta), f(\rho, \theta)\rho d\rho d\theta.$$

Here, $F_{nm}$ can be a complex number that is a coefficient of the nth and mth orders of the ART, $f(\rho,\theta)$ can be an image function on polar coordinates, and $V_{nm}(\rho,\theta)$ can be a basis function that can be expressed as a multiple of a function in the radial direction and a function in the normal direction.

The shape sequence can be generated in plurality to correspond to the real number part and the imaginary number part of the complex number.

In one embodiment, the shape sequence is frequency-converted along the time axis by one of the methods of discrete Fourier transform (DFT), discrete cosine transform (DCT) and discrete wavelet transform (DWT) in order to obtain the conversion coefficients.

In one embodiment, the similarity between a plurality of image sequences is determined by the similarity calculation of the shape sequence descriptor, and the calculation of the shape sequence descriptor is carried out by the equation $$\text{Distance}(Q, S) = \sum_i \sum_j \|Q(i, j) - S(i, j)\|.$$

Here, Q and S refer to shape sequence descriptors to be compared, and Q(i,j) and S(i,j) are the values of the ith column and the jth row of the two successive shape sequence descriptors to be compared.

Another aspect of the invention provides One or more processor-readable storage devices having processor-readable code embodied on the processor-readable storage devices, the processor-readable code for programming one or more processors to perform a method of extracting a shape sequence descriptor for content-based retrieval of an image sequence, the method comprising: i) converting image frames included in an image sequence, which expresses the motion of an object by a plurality of frames, to frames, in a quantity of n (natural number), including only the object that is separated from a background, ii) extracting shape descriptors, in a quantity of n, corresponding to the frames, in a quantity of n, using the object, iii) generating a shape sequence by aligning the shape descriptors, in a quantity of n, according to a temporal order, iv) obtaining conversion coefficients having frequency information by frequency-converting the shape sequence along the time axis and v) extracting a shape descriptor using coefficients in a low frequency area among the conversion coefficients.

Still another aspect of the invention provides an apparatus for extracting a shape descriptor for content-based retrieval of an image sequence that expresses the motion of an object by a plurality of frames, the apparatus comprising: i) means for converting image frames included in an image sequence to frames, in a quantity of n (natural number), including only the object that is separated from a background, ii) means for extracting shape descriptors, in a quantity of n, corresponding to the frames, in a quantity of n, using the object, iii) means for generating a shape sequence by aligning the shape descriptors, in a quantity of n, according to a temporal order, iv) means for obtaining conversion coefficients having frequency information by frequency-converting the shape sequence along the time axis and v) means for extracting a shape sequence descriptor using coefficients in a low frequency area among the conversion coefficients.

BRIEF DESCRIPTION OF THE DRAWINGS

FIG. 9 is a table showing the efficiency of retrieving the motion of an object based on one embodiment of the present invention and a typical method.

FIG. 15 is a table showing the performance of recognizing the emotion of an object based on one embodiment of the present invention and a typical method.

DESCRIPTION OF CERTAIN INVENTIVE EMBODIMENTS

Figure 1:
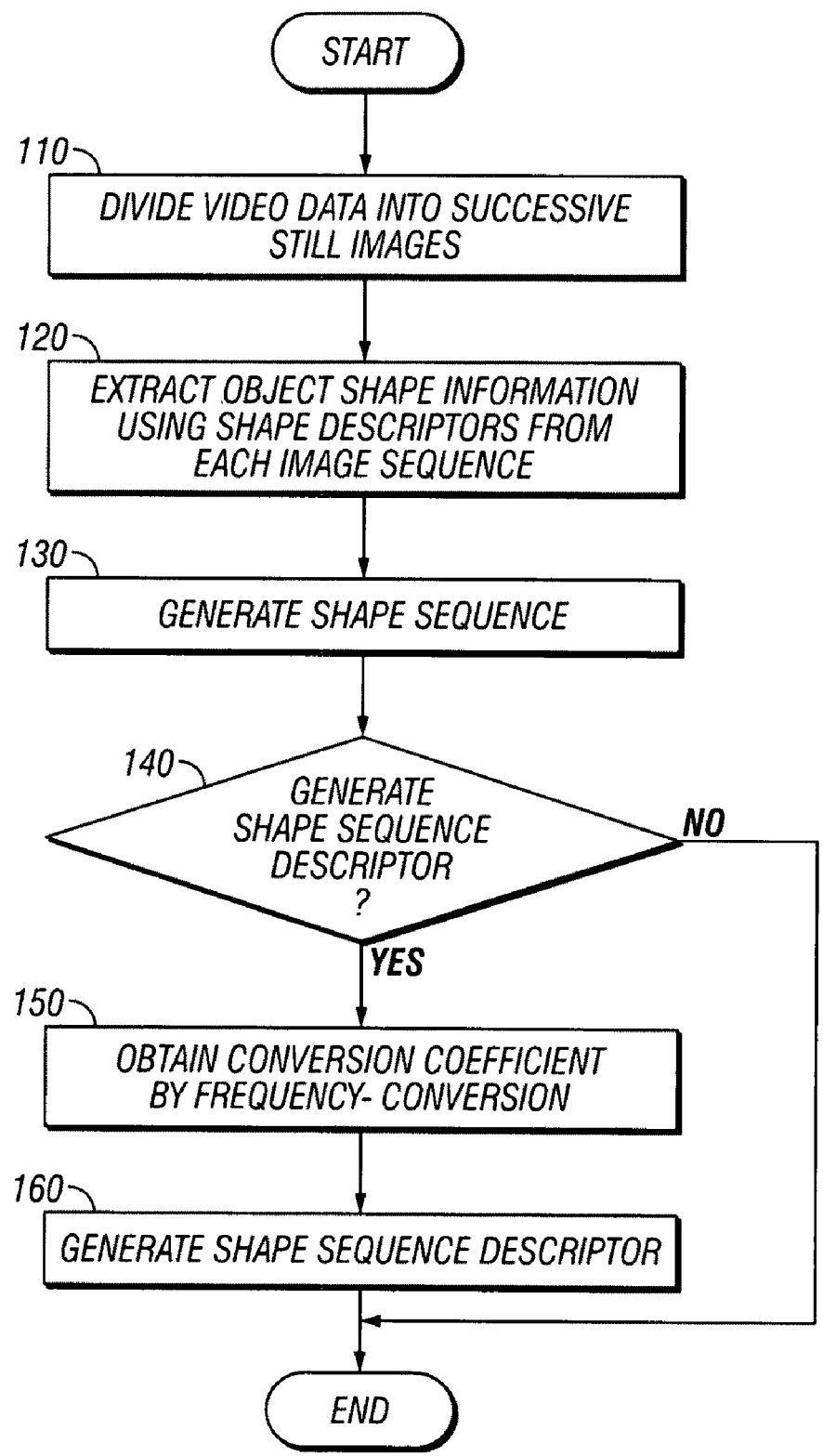
FIG. 1 shows a flowchart of a method of extracting information parts for retrieving image sequence data based on one embodiment of the present invention.

Below, embodiments will be described with reference to the accompanying drawings. The same reference numerals will be used for the same means, regardless of the figure number, in order to aid the understanding. Moreover, the numbers (e.g., first, second) used in the following description are merely means for identifying the same or similar objects.

Methods for retrieving multimedia data by use of the content of the multimedia data, not by use of the annotation recorded by someone who generated the data, are widely being studied. Of these methods, the content-based multimedia data retrieval method extracts the shape, color, texture and motion from multimedia data, records their properties and determines the similarities between pluralities of multimedia data based on the recorded properties to retrieve multimedia data with similar properties.

As the demand for retrieving multimedia data, as described above, increases, the Joint Technical Committee 1 of International Organization of Standardization and International Electrotechnical Commission (ISO/IEC JTC1) is establishing a standard for the content based multimedia data retrieval technology in connection with MPEG-7.

Currently, shape, color, texture and motion are used to describe the properties of multimedia data. The motion information becomes quite important for retrieval of video data. The video data retrieval method retrieves similar video data by measuring the similarity between the inquiry video data inputted by the user and the motion descriptor of video data stored in the database, after extracting the motion descriptor describing the motion properties of an object expressed by a sequence making up the video data. Here, the motion descriptor includes the camera motion, describing the motion of a camera, the motion trajectory, describing the path of an object, the parametric motion, describing the motion of the entire image, and the motion activity, expressing the activity of image motion quantitatively. Among these, the efficiency of a video retrieval method using the motion descriptor depends on how well the motion descriptor describes the property of video data.

That is, in video data, the motion of an object and the motion information play an important role in determining the content of the video. For example, the most important part in determining the content of a diving scene in a swimming competition, a rotating scene in figure skating and a tumbling scene in a gymnastics competition will be the motion of the athlete and the motion information.

However, it is very difficult or almost impossible to analyze and express the content of detailed motions, although overall motion information of an object can be expressed, if conventional MPEG-7 motion descriptors are used. For example, a human walking and an animal walking are two different contents, but these two can not be distinguished if only motion descriptors are used. In case of a motion trajectory, the type of object and its motion can not be distinguished because only the traces of the moving object is expressed. In case of a parametric motion, the non-rigid deformation, such as the human movement, can not be expressed.

In a typical method of retrieving video data suggested to solve aforementioned problems, a shape variation descriptor is used to allow the user to retrieve a desired image sequence by identifying the image sequence even if only a portion of an object moves in the image sequence data or partial shape variation of an object is frequent in a small number of frames.

In order to accurately distinguish the motions of an object, such as raising the hand, lowering the hand, sitting and rising, successive information of the motion is needed. However, the shape variation descriptor of the typical video data retrieval method does not use successive information of a motion, thereby not being able to distinguish each motion precisely.

One embodiment of the present invention relates to a method of extracting information parts, and a recorded medium recording the method, for retrieving image sequence data, particularly to a method for extracting information parts, and a recorded medium recording the method, for retrieving image sequence data that can distinguish the similarities between video data by capturing video data expressing the motion of an object as successive image frames (i.e., image sequence) and extracting information parts from each image sequence. In at least one embodiment of the invention, information parts for retrieving image sequence data include shape sequence and shape sequence descriptor for identifying the motion of an object as shape variation information of an object in accordance with time.

Figure 2:
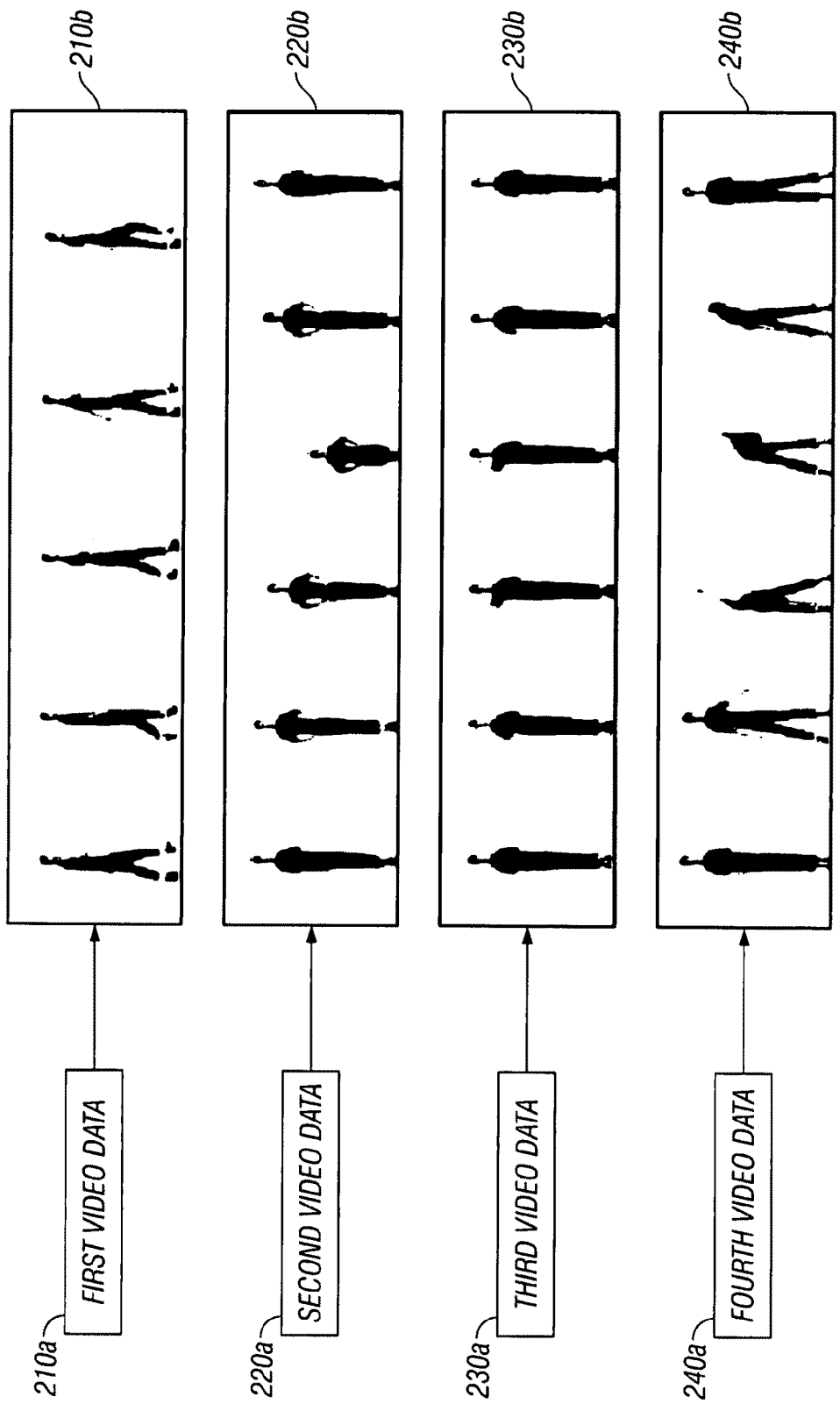
FIG. 2 shows an illustration of a plurality of still images divided in accordance with one embodiment of the present invention.
Figure 3:
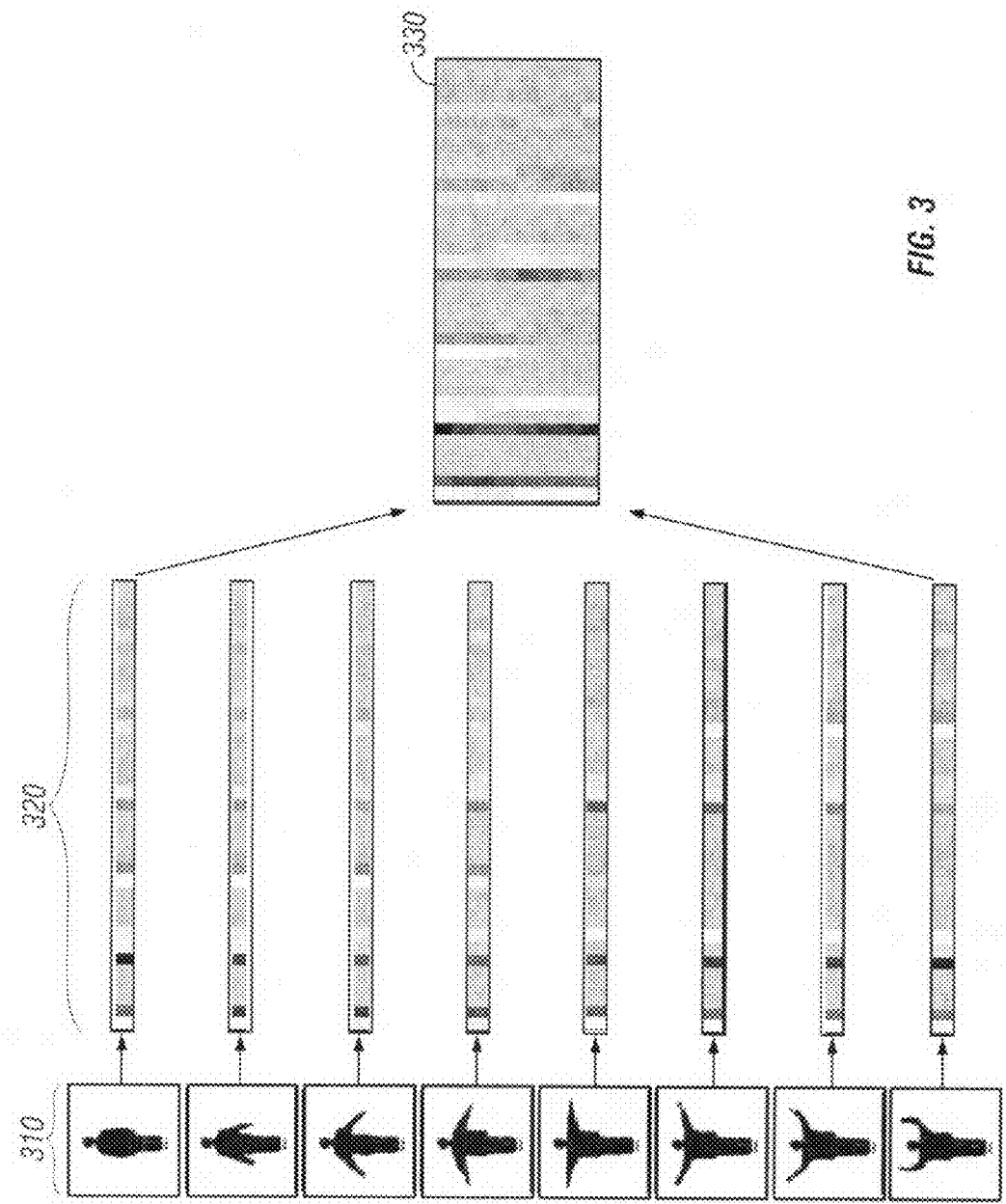
FIG. 3 shows a process of generating a shape sequence based on one embodiment of the present invention.
Figure 4:
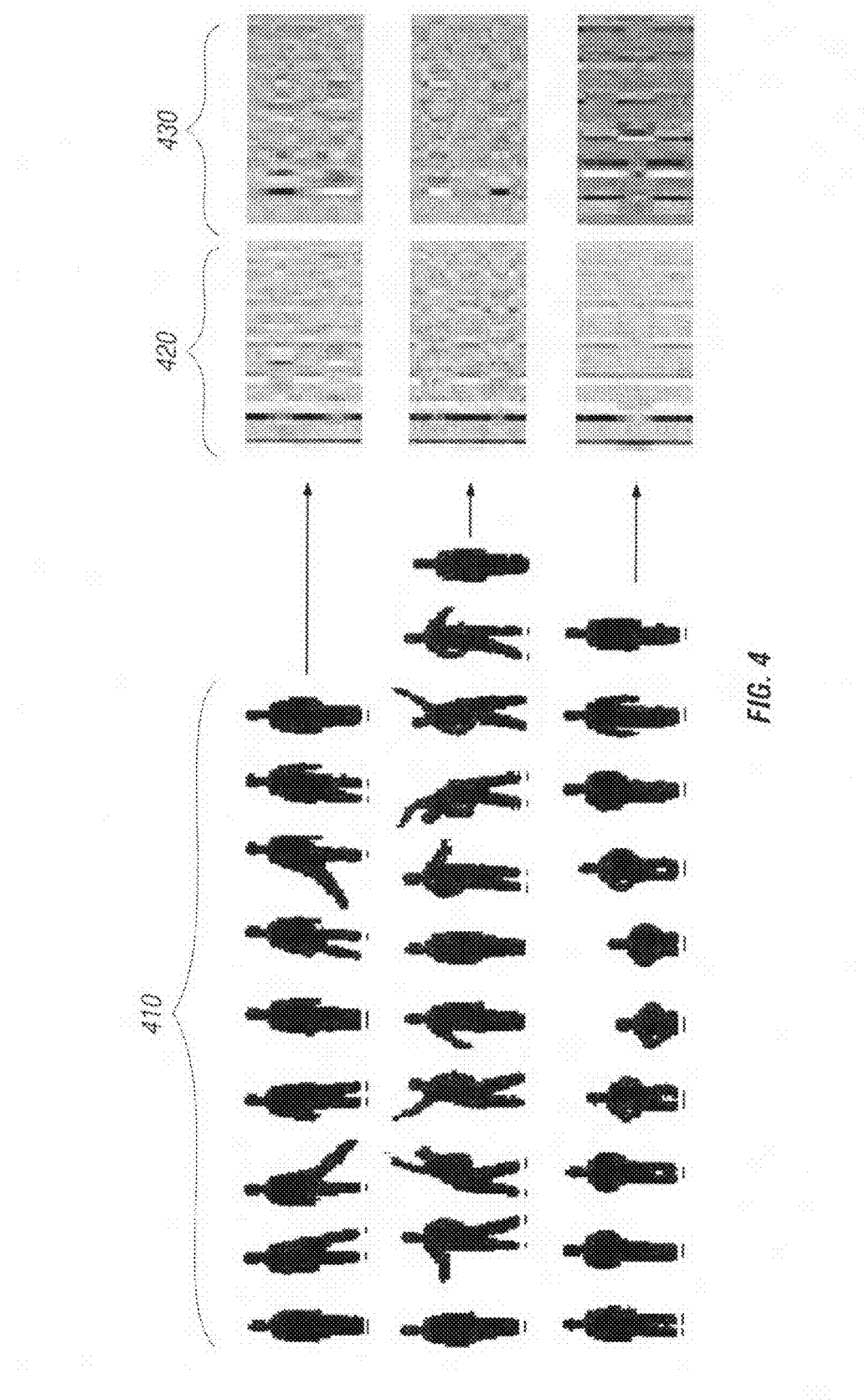
FIG. 4 illustrates shape sequences of the real number part and imaginary number part, corresponding to multimedia data comprised of a plurality of still images, based on one embodiment of the present invention.
Figure 5:
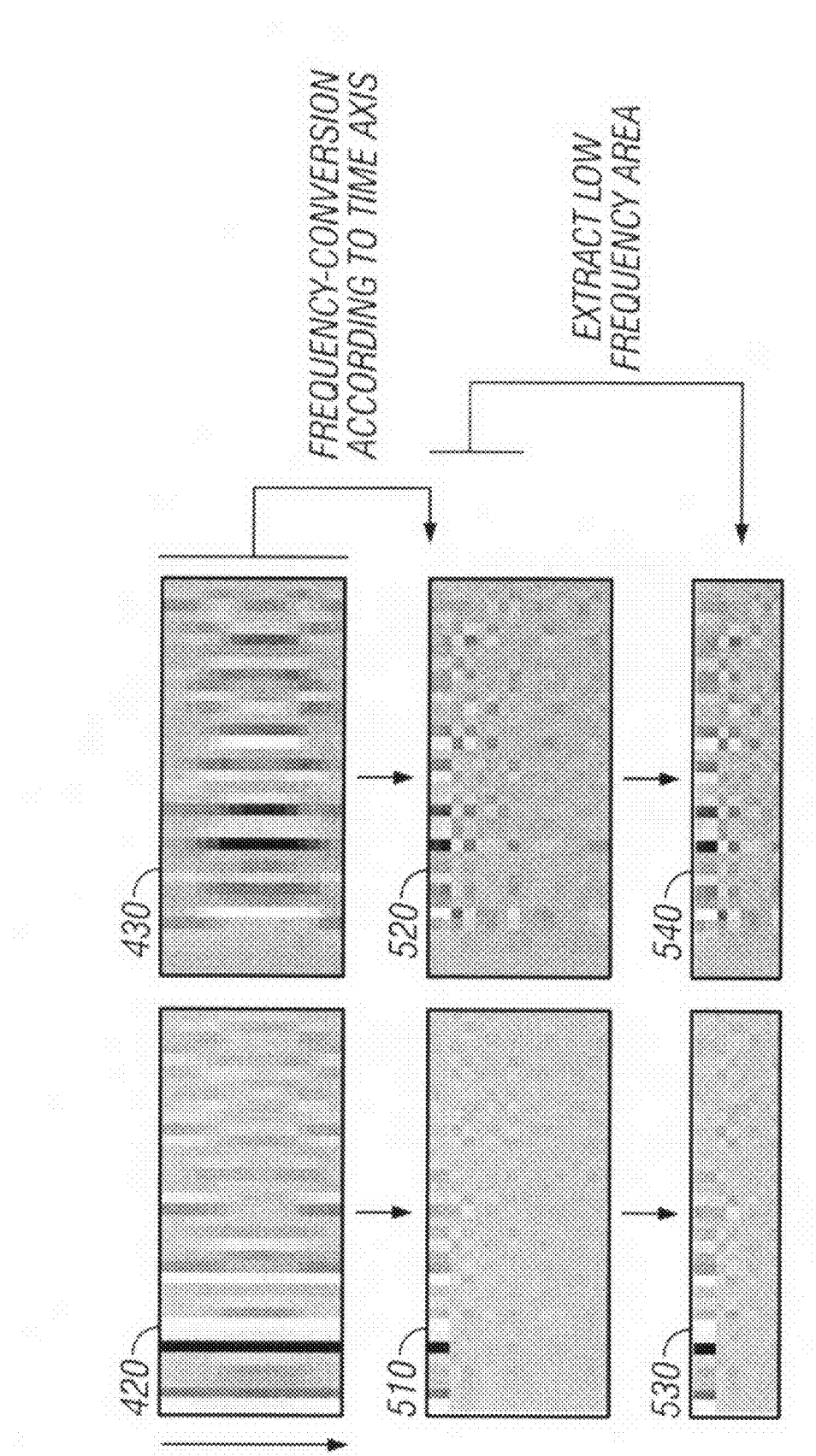
FIG. 5 shows a process of generating a shape sequence descriptor based on one embodiment of the present invention.

FIG. 1 shows a flowchart of a method for extracting information parts for retrieving image sequence data based on one embodiment of the present invention; FIG. 2 shows an illustration of a plurality of still images divided in accordance with one embodiment of the present invention; FIG. 3 shows a process of generating a shape sequence based on one embodiment of the present invention; FIG. 4 illustrates shape sequences of the real number part and imaginary number part, corresponding to multimedia data comprised of a plurality of still images, based on one embodiment of the present invention; and FIG. 5 shows a process of generating a shape sequence descriptor based on one embodiment of the present invention.

The following processes, illustrated in FIG. 1, may be realized in a form of software program, as well as a form of information parts extracting apparatus, to perform a method for extracting information parts. Those of ordinary skill in the art should be able to understand the structure of an information parts extracting apparatus through the following description, and thus a separate description of an information parts extracting apparatus will not be provided.

As illustrated in FIG. 1, the process of extracting information parts starts with the step of dividing inputted multimedia data (i.e., video, animation or any other image sequence) into individual still images, as represented by step 110.

The state of multimedia data divided into individual still images by the above step is illustrated in FIG. 2. As shown in FIG. 2, multimedia data, represented by 210a, 220a, 230a and 240a, can be divided into a group of still images, represented by 210b, 220b, 230b and 240b, displaying a series of successive motions. That is, each frame in the multimedia data can be converted to a frame that only contains information of an object separated from the background.

Then, the step of extracting object shape information, represented by step 120, using a shape descriptor in each image sequence is carried out. This can be done because the sequence of shape feature vectors on an object contained in an image sequence can be obtained by extracting and listing feature vectors that can describe the still shaped of an object in each still image frame.

A shape descriptor is a descriptor indicating a feature quantity of the object motion, and can use the shape information of an image based on the pixel data of an image area.

The shape descriptor used in one embodiment of the present invention can be extracted through the steps of converting individual frames contained in multimedia data to frames that are separated from the background and comprising object information only, and extracting the shape descriptor from object information in order to extract shape information of an object.

Below, a method for extracting the shape descriptor (i.e., shape feature vectors) using ART (angular radial transform), an embodiment of the shape descriptor, is described.

ART is an orthogonal unitary transform, in which the basis of a unit circle is a sinusoidal function on polar coordinates. It can describe rotation-invariant shapes and has no redundancy of information due to the orthogonality. ART can be defined as Eq. 1 below:

$$F_{nm} = <V_{nm}(\rho, \theta), f(\rho, \theta)> \quad \text{[Eq. 1]}$$
$$= \int_0^{2\pi} \int_0^1 V_{nm}^*(\rho, \theta), f(\rho, \theta) \rho d\rho d\theta$$

Here, $F_{nm}$ is a coefficient of the nth and mth orders, and with the magnitude of this value the feature quantity of an image can be expressed. However, the value when n=0 and m=0 is not used as a descriptor but used to normalize each coefficient value. $f(\rho, \theta)$ is an image function on polar coordinates. $V_{nm}(\rho, \theta)$ is a basis function that can be expressed as a multiple of a function in the radial direction and a function in the normal direction, and can be expressed as Eq. 2 below:

$$V_{nm}(\rho, \theta) = A_m(\theta) R_n(\rho) \quad \text{[Eq. 2]}$$

Here, $A_m(\theta)$ is an angular function, constituting an ART basis function, and $R_n(\rho)$ is a radial function, constituting an ART basis function. In order to express the rotation-invariant property, $A_m(\theta)$ must be expressed as in Eq. 3 below:

$$A_m(\theta) = \frac{1}{2x} e^{jm\theta} \quad \text{[Eq. 3]}$$

Here, $A_m(\theta)$ is a radial basis function, expressed as ART-C and ART-S when a cosine function and a sine function are used, respectively.

$R_n(\rho)$ of Eq. 2 described above can have various types, and can be expressed as ART-C as in Eq. 4 depending on the type.

$$ART-C: R_n^a(\rho) = \begin{cases} 1, & n = 0 \\ 2\cos(\pi n_a), & n \neq 0 \end{cases} \quad \text{[Eq. 4]}$$

The ART coefficient extracted from each frame indicates how much component of the ART basis is included in the original image, and thus the original image can be recovered by combining the ART coefficient and the multiple of the ART basis function. Theoretically, it takes an infinitely large number of combinations of ART coefficient and multiple of basis function to obtain an image that is completely identical to the original image. In reality, however, an image very similar to the original image can be obtained by combining 20 to 30 of the information.

The absolute value of the ART coefficient, calculated from Eq. 1 above has rotation invariance, as implied by Eq. 5. That is, it is the same as Eq. 6 of ART coefficients, which are extracted from the original image and the image rotated by a degrees. However, taking the absolute value on the value of rotated image results in the value of original image, as in Eq. 7, and thus the magnitude of ART has the property of rotation invariance.

$$f^\alpha(\rho, \theta) = f(\rho, \alpha + \theta) \quad \text{[Eq. 5]}$$
$$F_{nm}^\alpha = F_{nm} e^{jm\alpha} \quad \text{[Eq. 6]}$$
$$\|F_{nm}^\alpha\| = \|F_{nm}\| \quad \text{[Eq. 7]}$$

The process of generating a shape sequence based on one embodiment of the present invention is illustrated in FIG. 3. As shown in FIG. 3, the one-dimensional-data shape descriptors 320 are generated from still images, forming the multimedia data, by angular radial transforming according to object information 310 separated from the background. The shape descriptor is structured to display in the color (i.e., visual information of ART coefficients) corresponding to the magnitude of ART coefficient.

As shown in FIG. 3, the shape sequence may be displayed in the magnitude of a complex number as an ART-ed coefficient, but as shown in FIG. 4 the real number part 420 and the imaginary number part 430 of the complex number corresponding to the object information 410 included in the pertinent individual frame can also be separated as individual shape sequences.

Then, a shape sequence is generated, in step 130, using the shape descriptors 320 generated in step 120. In other words, by arranging the shape descriptors 320 generated through above steps along the time axis, a shape sequence 330, which is two-dimensional information, is generated. The shape sequence 330 is generated regardless of the speed of the motion by normalizing the shape descriptors 320 along the time axis to make them have predetermined intervals. For normalization method to generate the shape sequence 330, linear interpolation, for example, can be used along the time axis.

Then, in step 140, whether it is necessary to generate a shape sequence descriptor is determined.

If it is necessary to generate a shape sequence descriptor, the shape sequence is frequency-converted along the time axis in step 150 to obtain a conversion coefficient. The shape sequence generated (extracted) through the steps described above may be directly used in order to express the moving shape of an object according to the real time and to retrieve multimedia data. However, the retrieval may take too long because the shape sequence is relatively too large, and thus a coefficient produced through transformation, which can properly express the properties a signal, can be used. In other words, the shape sequence descriptor, which is generated by taking only the coefficient of low frequency after frequency-converting the column of the extracted shape sequence, can be used in expression of the moving shape of an object or retrieval of multimedia data. Here, the method of converting frequency to generate a shape sequence descriptor can be, for example, discrete Fourier transform (DFT), discrete cosine cosine transform (DCT), discrete wavelet transform (DWT) or other varieties of frequency conversion methods.

Then, in step 160, by extracting some coefficients of low frequency area among the frequency-converted conversion coefficients, a shape sequence descriptor is generated.

The process of generating a shape sequence descriptor based on one embodiment of the present invention is illustrated in FIG. 5.

That is, the shape sequence 420 corresponding to the real number part and the shape sequence 430 corresponding to the imaginary number part, included in a complex number as an ART-ed coefficient, are frequency-converted along the time axis to generate frequency-converted shape sequences 510, 520.

Later, by extracting the low frequency area only from the frequency-converted shape sequences 510, 520, the shape sequence descriptor 530 corresponding to the real number part and the shape sequence descriptor 540 corresponding to the imaginary umber part, included in a complex number as an ART-ed coefficient.

The calculation of similarity between shape sequence descriptors necessary for motion recognition and multimedia data retrieval can be defined as a sum of the absolute values of the differences of two descriptor components, as expressed in Eq. 8 below:

$$\text{Distance}(Q, S) + \sum_i \sum_j \|Q(i, j) - S(i, j)\| \quad \text{[Eq. 8]}$$

Here, Q and S refer to shape sequence descriptors to be compared, and $Q(i,j)$ and $S(i,j)$ are the values of the ith column (i.e., time axis) and the jth row (i.e., an axis to have the ART coefficient correspond to the object) of the two successive shape sequence descriptors to be compared.

Figure 6:
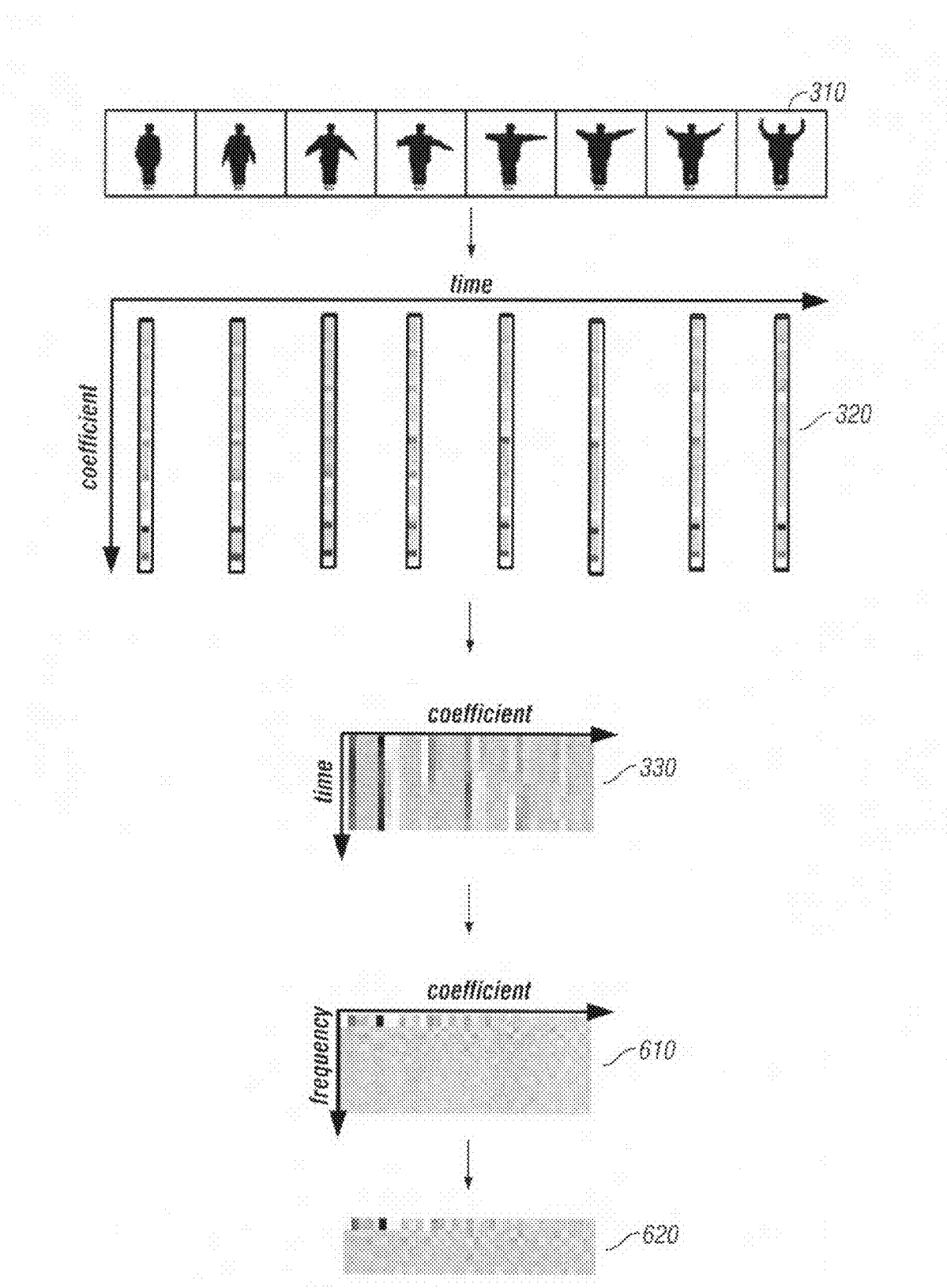
FIG. 6 shows a process of generating a shape sequence descriptor from multimedia data based on one embodiment of the present invention.

FIG. 6 shows a process of generating a shape sequence descriptor from multimedia data based on one embodiment of the present invention.

The steps described with reference to FIGS. 1-5 are illustrated as a series of steps in FIG. 6.

As shown in FIG. 6, a single multimedia data can be divided into a series of individual frames 310, and the individual frames 310 can be generated as shape descriptors 320 by ART conversion.

The generated shape descriptors 320 can be normalized along the time axis to form a sequence 330, which carries out frequency-conversion along the time axis to be converted to a frequency-converted shape sequence 610.

Later, a shape sequence descriptor 620 can be generated by extracting only the low frequency area of the frequency-converted shape sequence 610.

The similarity between shape sequence descriptors, needed for motion recognition and multimedia data retrieval, can be calculated with Eq. 8 described above. The smaller the calculated value is, the more similar two multimedia data are.

Figure 7:
FIGS. 7 and 8 show examples of video clips for testing the efficiency of retrieving the notion of an object based on one embodiment of the present invention and a typical method, respectively.
Figure 7:
Figure 7:
Figure 7:
Figure 7:
Figure 7:
Figure 7:
Figure 7:
Figure 7:
Figure 7:
Figure 7:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 8:
Figure 10:
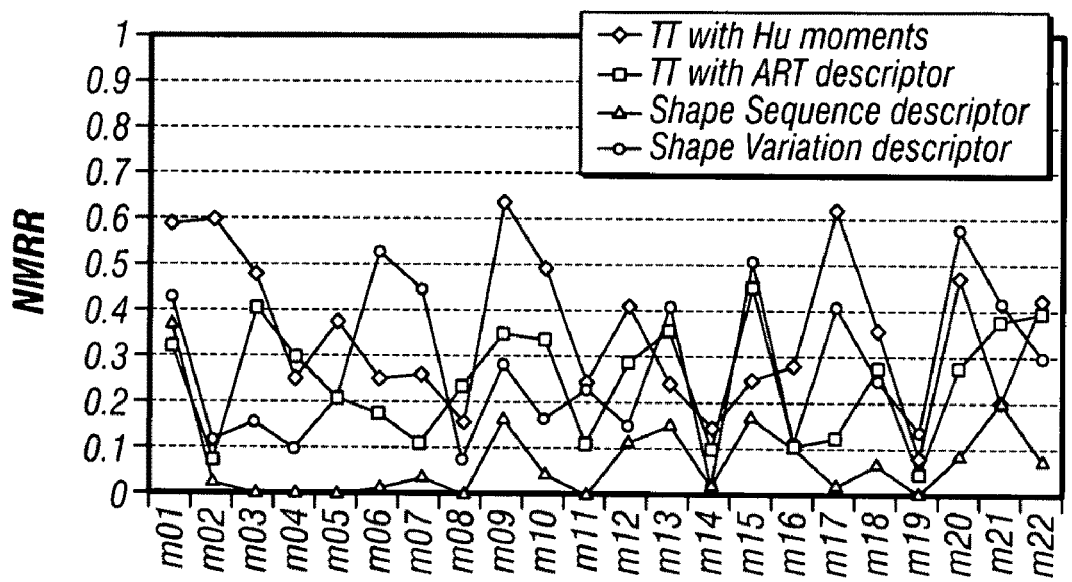
FIG. 10 is a graph showing the performance of retrieving the motion of an object based on one embodiment of the present invention and a typical method.
Figure 11:
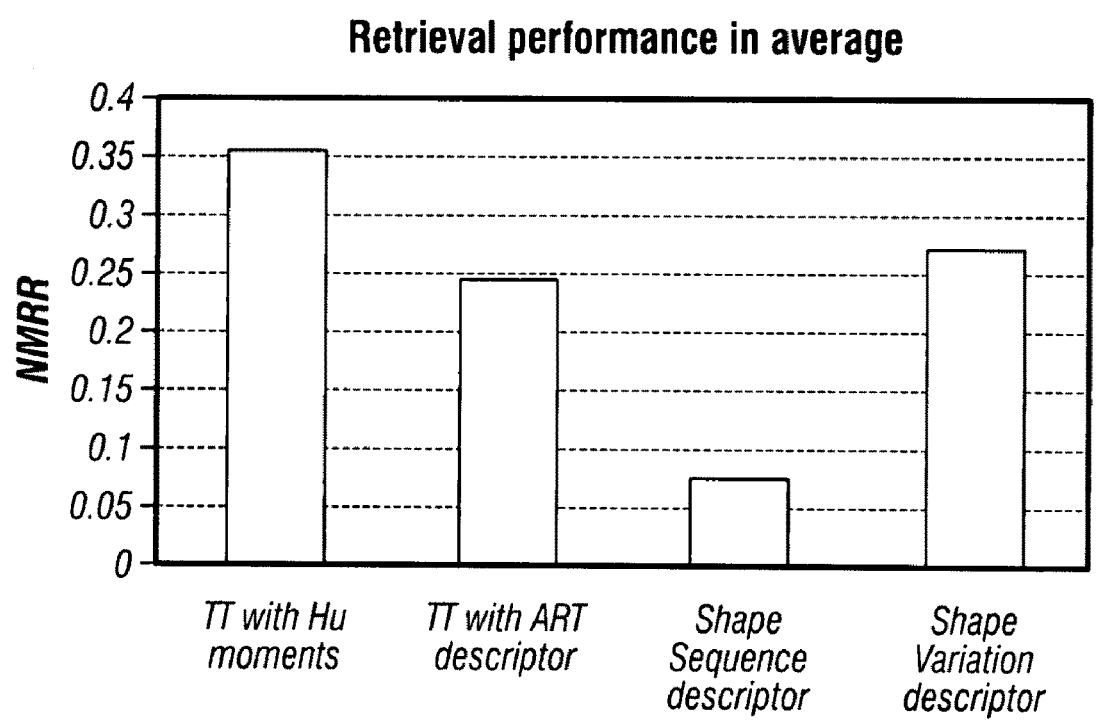
FIG. 11 is a graph showing the average performance of retrieving the motion of an object based on one embodiment of the present invention and a typical method.
Figure 12:
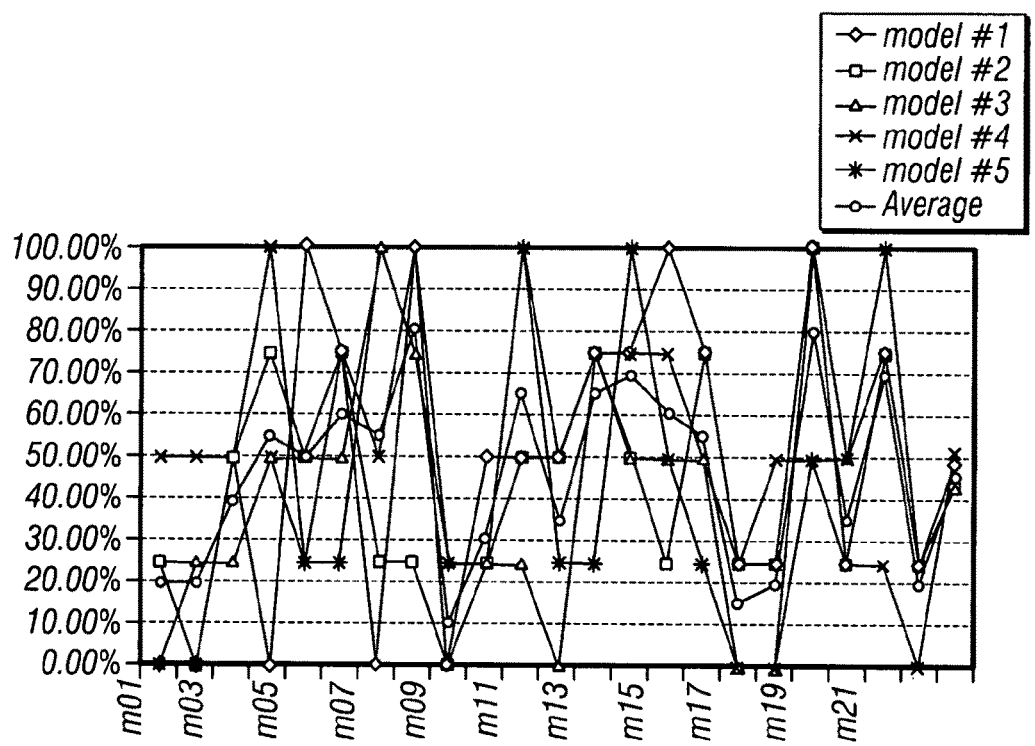
FIGS. 12-14 are graphs showing the performance of recognizing the motion of an object based on one embodiment of the present invention and a typical method.
Figure 13:
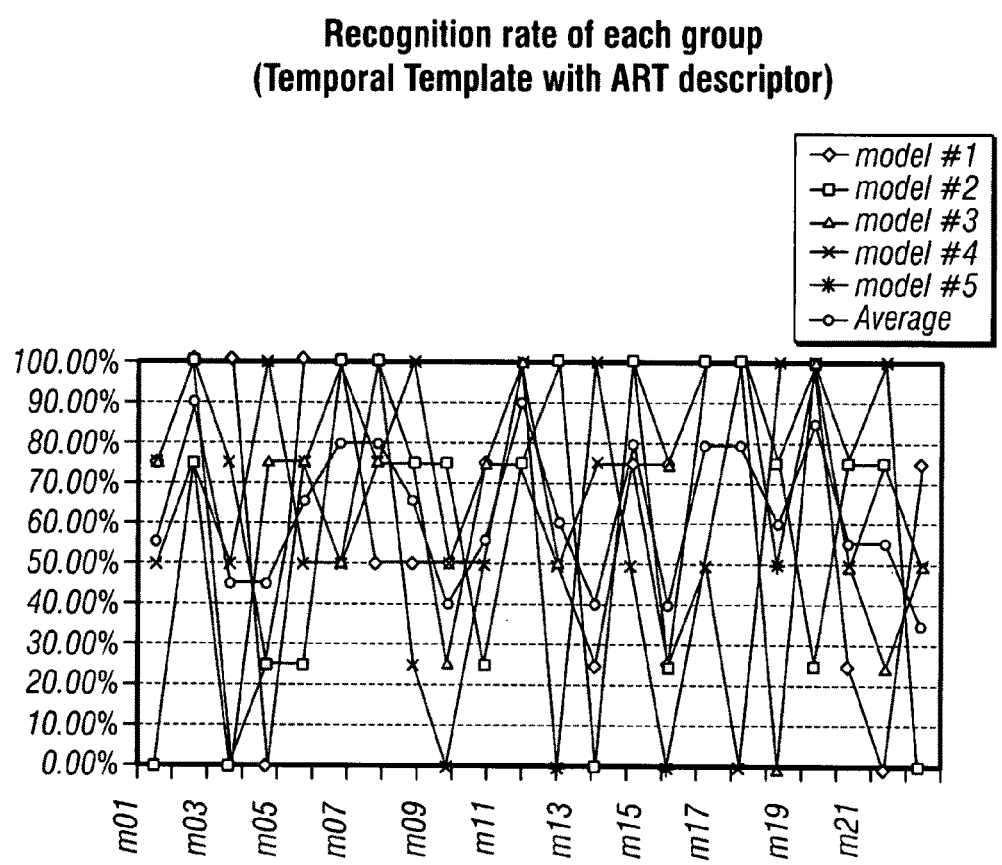
Figure 14:
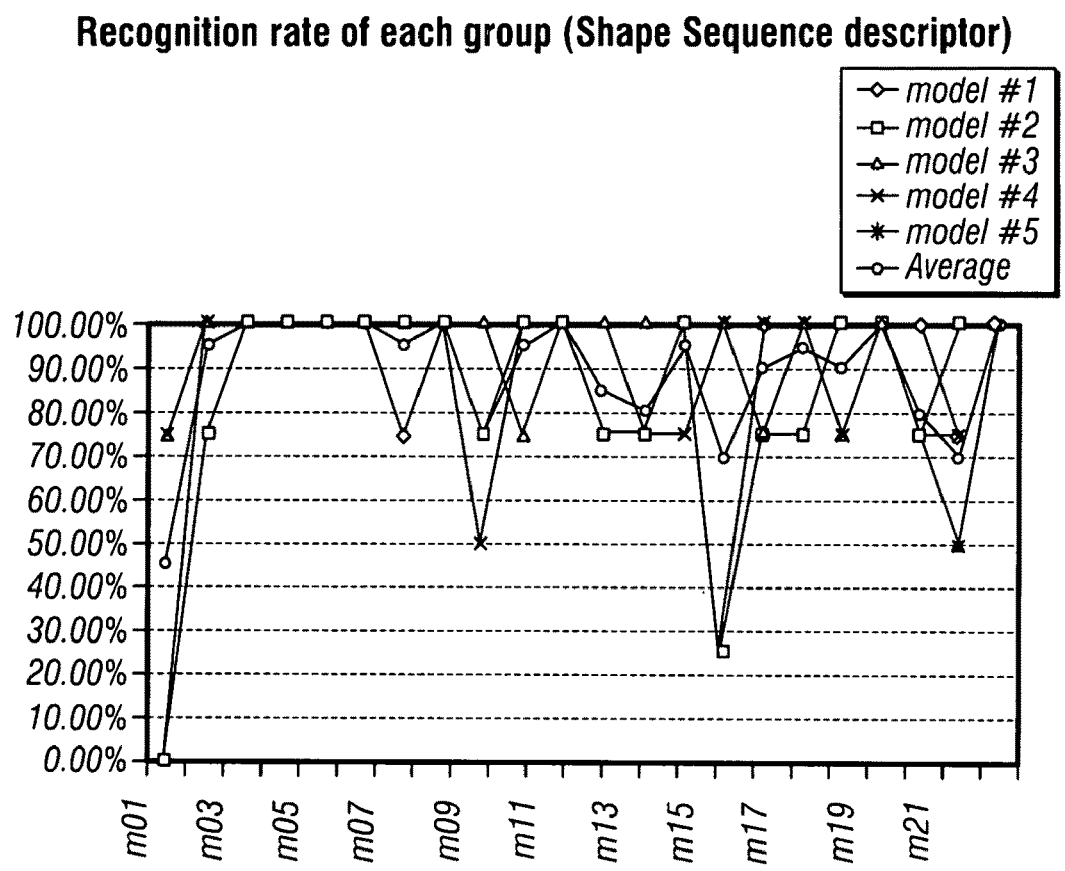
Figure 16:
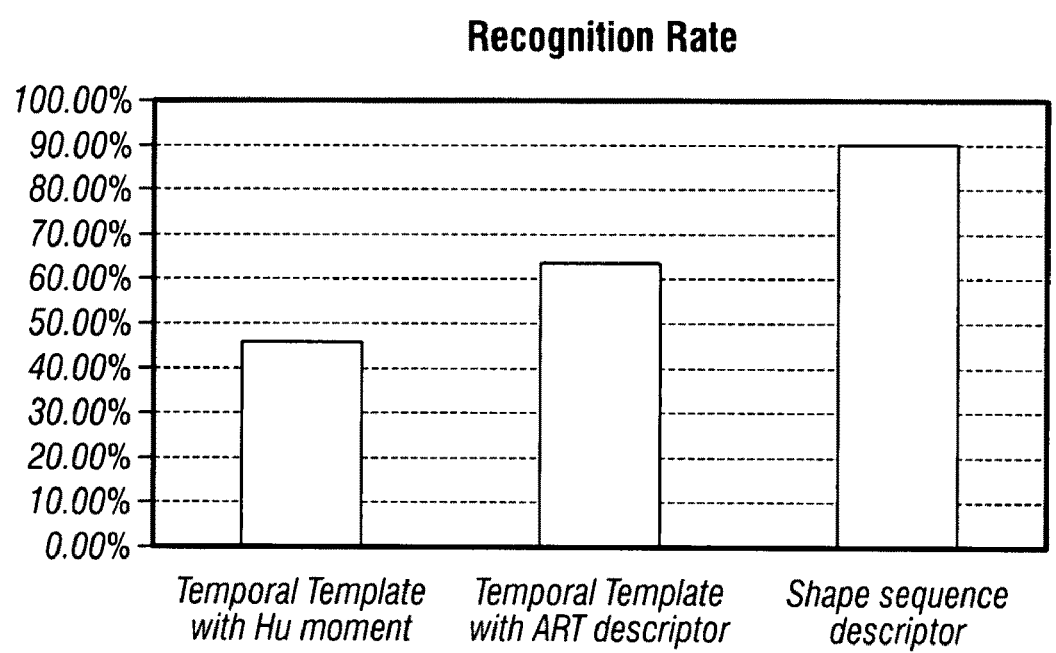
FIG. 16 is a graph showing the average performance of recognizing the motion of an object based on one embodiment of the present invention and a typical method.

FIGS. 7 and 8 show examples of video clips for testing the efficiency of retrieving the motion of an object based on one embodiment of the present invention and a typical method, respectively. FIG. 9 is a table showing the efficiency of retrieving the motion of an object based on one embodiment of the present invention and a typical method. FIG. 10 is a graph showing the performance of retrieving the motion of an object based on one embodiment of the present invention and a typical method. FIG. 11 is a graph showing the average performance of retrieving the motion of an object based on one embodiment of the present invention and a typical method. FIGS. 12-14 are graphs showing the performance of recognizing the motion of an object based on one embodiment of the present invention and a typical method. FIG. 15 is a table showing the performance of recognizing the emotion of an object based on one embodiment of the present invention and a typical method. FIG. 16 is a graph showing the average performance of recognizing the motion of an object based on one embodiment of the present invention and a typical method.

The data set shown (that is, used in the test) in FIGS. 7 and 8 is of MPEG-7 core experiment dataset Part-B, and the pertinent data set is comprised of 110 video clips, depicting 22 types of motions by 5 people.

Using the data set illustrated in FIGS. 7 and 8, the retrieval performance and recognition rate of the motion of an object are compared using the temporal template with Hu moments, the temporal template with ART descriptor, the shape variation descriptor and the shape sequence descriptor, and the results are shown in FIGS. 9-15. The method for extracting an ART descriptor and a shape variation descriptor is described in detail in KR10-2002-0034258, an earlier application by this applicant, and thus will not be described here. Besides, it is apparent that the essential matters of technical spirits described in the earlier application can be applied equally or similarly, and thus the description will not be repeated here.

It is decided that the normalized modified retrieval rank (NMRR) is used for the gauge for comparing the retrieval performance based on one embodiment of the present invention and a typical method, and the recognition rate is defined as follows.

The recognition rate measures whether an inquiry of a particular motion correctly determines a pertinent motion, and thus a key motion needs to be registered. However, due to the small quantity of data, the recognition test will be carried out in the following method.

Since there are 5 data per motion, the first motion is registered as the key motion, and the rest 4 data are inquired to calculate if the pertinent motion is correctly recognized. In other words, 22 motions are registered for the first person, and the motions of the rest 4 people are inquired in turn to calculate the recognition. Through this, the recognition rate of Eq. 9 can be calculated.

Recognition rate=Number of correct recognition/
(4×100) [Eq. 9]

Moreover, the average of the recognition rate can be calculated by applying this equation to all 22 motions.

However, using the above test method only may result in errors according to the selection of the model. In such case, the model can be changed (for example, register the second person data as the standard model), and the rest 4 people are inquired to test for the recognition. Furthermore, the recognition rates are calculated by changing the model, and the average is defined as the final recognition rate.

Referring to FIGS. 9-11, in which the test results in accordance with the above test method are shown, the method using a shape sequence descriptor, based on one embodiment of the present invention, results in the best retrieval performance.

Moreover, referring to FIGS. 12-16, in which the test results of the motion recognition rate of an object are shown, the method using a shape sequence descriptor, based on one embodiment of the present invention, results in the best motion recognition performance.

The drawings and disclosure are merely examples used to describe embodiments of the present invention, shall by no means be construed to limit or restrict the scope of the present invention disclosed in the appended claims. Any person of ordinary skill in the art to which the invention pertains shall understand that a very large number of permutations and equivalent embodiments are possible. The true scope of the present invention shall only be defined by the appended claims.

As described above, a method of extracting information parts, and the recorded medium recording the method, for retrieving image sequence data based on at least one embodiment of the present invention can capture video data expressing the motion of an object as successive image frames (i.e., image sequence), extract information parts from each image sequence and distinguish the similarity between video data. Here, the information parts for retrieving image sequence data include the shape sequence and the shape sequence descriptor, for identifying the motion of an object as shape variation information of an object in accordance with time.

Moreover, at least one embodiment of the present invention can use the motion sequence of an object, as well as the shape variation of an object, to distinguish the motions that are different from each other, improving the performance of video data retrieval.

What is claimed is:

1. A method of extracting a shape sequence descriptor for content-based retrieval of an image sequence that expresses the motion of an object by a plurality of frames, the method comprising:
converting image frames included in an image sequence to frames, in a quantity of n (natural number), including only the object that is separated from a background;
extracting shape descriptors, in a quantity of n, corresponding to the frames, in a quantity of n, using the object;
generating a shape sequence by aligning the shape descriptors, in a quantity of n, according to a temporal order;
obtaining conversion coefficients having frequency information by frequency-converting the shape sequence along the time axis; and
extracting a shape sequence descriptor using coefficients in a low frequency area among the conversion coefficients.

2. The method of claim 1, further comprising, before the converting, normalizing the shape descriptors, in a quantity of n, along the time axis in order to generate the shape sequence.

3. The method of claim 1, wherein the shape sequence is frequency-converted along the time axis by one of the methods of discrete Fourier transform (DFT), discrete cosine transform (DCT) and discrete wavelet transform (DWT) in order to obtain the conversion coefficients.

4. The method of claim 1, wherein the similarity between a plurality of image sequences is determined by the similarity calculation of the shape sequence descriptor, and the calculation of the shape sequence descriptor is carried out by the equation $$\text{Distance}(Q, S) + \sum_i \sum_j \|Q(i, j) - S(i, j)\|$$

wherein Q and S refer to shape sequence descriptors to be compared, and Q(i,j) and S(i,j) are the values of the ith column and the jth row of the two successive shape sequence descriptors to be compared.

5. The method of claim 1, wherein the shape descriptors are extracted from the object in accordance with an angular radial transform (ART), defined by the equation $$F_{nm} = \,<V_{nm}(\rho,\theta), f(\rho,\theta)> = \int_0^{2\pi}\int_0^1 V_{nm}^*(\rho,\theta), f(\rho,\theta)\rho d\rho d\theta$$

wherein $F_{nm}$ is a complex number that is a coefficient of the nth and mth orders of the ART, the $f(\rho,\theta)$ is an image function on polar coordinates, and $V_{nm}(\rho,\theta)$ is a basis function that can be expressed as a multiple of a function in the radial direction and a function in the normal direction.

6. The method of claim 5, wherein the shape sequence is generated in plurality to correspond to the real number part and the imaginary number part of the complex number.

7. One or more processor-readable storage devices having processor-readable code embodied on the processor-readable storage devices, the processor-readable code for programming one or more processors to perform a method of extracting a shape sequence descriptor for content-based retrieval of an image sequence, the method comprising:
converting image frames included in an image sequence, which expresses the motion of an object by a plurality of frames, to frames, in a quantity of n (natural number), including only the object that is separated from a background;
extracting shape descriptors, in a quantity of n, corresponding to the frames, in a quantity of n, using the object;
generating a shape sequence by aligning the shape descriptors, in a quantity of n, according to a temporal order;
obtaining conversion coefficients having frequency information by frequency-converting the shape sequence along the time axis; and
extracting a shape sequence descriptor using coefficients in a low frequency area among the conversion coefficients.

8. One or more processor-readable storage devices of claim 7, wherein the method further comprises, before the converting, normalizing the shape descriptors, in a quantity of n, along the time axis in order to generate the shape sequence.

9. One or more processor-readable storage devices of claim 7, wherein the shape sequence is frequency-converted along the time axis by one of the methods of discrete Fourier transform (DFT), discrete cosine transform (DCT) and discrete wavelet transform (DWT) in order to obtain the conversion coefficients.

10. One or more processor-readable storage devices of claim 7, wherein the similarity between a plurality of image sequences is determined by the similarity calculation of the shape sequence descriptor, and the calculation of the shape sequence descriptor is carried out by the equation $$\text{Distance}(Q, S) = \sum_i \sum_j \|Q(i, j) - S(i, j)\|$$

wherein Q and S refer to shape sequence descriptors to be compared, and Q(i,j) and S(i,j) are the values of the ith column and the jth row of the two successive shape sequence descriptors to be compared.

11. One or more processor-readable storage devices of claim 7, wherein the shape descriptors are extracted from the object in accordance with an angular radial transform (ART), defined by the equation $$F_{nm} = <V_{nm}(\rho, \theta), f(\rho, \theta)> = \int_0^{2\pi} \int_0^1 V_{nm}^*(\rho, \theta), f(\rho, \theta) \rho d\rho d\theta$$

wherein $F_{nm}$ is a complex number that is a coefficient of the nth and mth orders of the ART, the $f(\rho,\theta)$ is an image function on polar coordinates, and $V_{nm}(\rho,\theta)$ is a basis function that can be expressed as a multiple of a function in the radial direction and a function in the normal direction.

12. One or more processor-readable storage devices of claim 11, wherein the shape sequence is generated in plurality to correspond to the real number part and the imaginary number part of the complex number.

13. An apparatus for extracting a shape sequence descriptor for content-based retrieval of an image sequence that expresses the motion of an object by a plurality of frames, the apparatus comprising:
  means for converting image frames included in an image sequence to frames, in a quantity of n (natural number), including only the object that is separated from a background;
  means for extracting shape descriptors, in a quantity of n, corresponding to the frames, in a quantity of n, using the object;
  means for generating a shape sequence by aligning the shape descriptors, in a quantity of n, according to a temporal order;
  means for obtaining conversion coefficients having frequency information by frequency-converting the shape sequence along the time axis; and
  means for extracting a shape sequence descriptor using coefficients in a low frequency area among the conversion coefficients.

* * * * *